US011370104B2

(12) United States Patent
Takada (10) Patent No.: US 11,370,104 B2
(45) Date of Patent: Jun. 28, 2022

(54) CONNECTION STRUCTURE OF OPERATION ROD

(71) Applicant: NAGAKI SEIKI CO., LTD., Osaka (JP)

(72) Inventor: Junsuke Takada, Osaka (JP)

(73) Assignee: NAGAKI SEIKI CO., LTD., Osaka (JP)

( * ) Notice: Subject to any disclaimer, the term of this patent is extended or adjusted under 35 U.S.C. 154(b) by 130 days.

(21) Appl. No.: 16/628,766

(22) PCT Filed: May 29, 2018

(86) PCT No.: PCT/JP2018/020500
§ 371 (c)(1),
(2) Date: Jan. 6, 2020

(87) PCT Pub. No.: WO2019/017077
PCT Pub. Date: Jan. 24, 2019

(65) Prior Publication Data
US 2020/0122313 A1    Apr. 23, 2020

(30) Foreign Application Priority Data

Jul. 21, 2017 (JP) .............................. JP2017-142219

(51) Int. Cl.
*B25G 3/04* (2006.01)
*F16B 7/04* (2006.01)
(Continued)

(52) U.S. Cl.
CPC ................. *B25G 3/04* (2013.01); *B25G 3/16* (2013.01); *F16B 7/042* (2013.01); *F16B 7/20* (2013.01)

(58) Field of Classification Search
CPC ............. Y10T 403/591; Y10T 403/592; Y10T 403/597; Y10T 403/598; Y10T 403/599;
(Continued)

(56) References Cited

U.S. PATENT DOCUMENTS 3,423,781 A * 1/1969 Henson .................... A47L 13/24
15/145
4,603,998 A * 8/1986 Bober ....................... F16D 1/10
403/322.2
(Continued)

FOREIGN PATENT DOCUMENTS

| CA | 2882150 | 8/2016 |
|----|---------|--------|
| CN | 201175888 | 1/2009 |

(Continued)

OTHER PUBLICATIONS

Extended European Search Report issued in European Patent Application No. 18835144.9, dated Nov. 27, 2020.
(Continued)

*Primary Examiner* — Jeffrey O'Brien
(74) *Attorney, Agent, or Firm* — Greenblum & Bernstein, P.L.C.

(57) ABSTRACT

Provided is a connection structure of an operation rod in which a connection object such as a tip tool can be easily attached to and detached from the operation rod in a relatively short time without causing a fixed state. The main body is inserted into the cylindrical operation rod on the tip side. An engagement pair is formed of an engagement part with a notch provided to the main body on a tip side and an engagement part with an engagement pin provided to a tip tool. An inner slider on which a recessed groove is formed in a circumferential direction is relatively slidably disposed to the main body on an inner diameter side. An outer slider is relatively slidably disposed to the main body on an outer
(Continued)

diameter side, wherein an opposing recess which can oppose to the recessed grove is formed on the outer slider.

6 Claims, 7 Drawing Sheets

(51) Int. Cl.
*B25G 3/16* (2006.01)
*F16B 7/20* (2006.01)

(58) Field of Classification Search
CPC . F16B 7/042; F16B 21/04; F16B 7/20; B25G 3/04; B25G 3/16; B25G 3/28
See application file for complete search history.

(56) References Cited

U.S. PATENT DOCUMENTS

| | | | | |
|---|---|---|---|---|
| 4,616,952 A * | 10/1986 | Schott | ............... | F16D 1/116 403/316 |
| 4,639,162 A * | 1/1987 | Geisthoff | ............... | F16D 1/116 403/316 |
| 5,407,293 A * | 4/1995 | Crainich | ............... | A61B 17/29 403/322.1 |
| 5,741,084 A * | 4/1998 | Del Rio | ............... | A61B 17/1633 285/361 |
| 6,003,414 A * | 12/1999 | Hsieh | ............... | B25B 23/0014 403/325 |
| 6,071,035 A * | 6/2000 | McKelvy | ............... | B25F 3/00 403/320 |
| 6,126,359 A * | 10/2000 | Dittrich | ............... | B25G 3/04 403/349 |
| 6,379,076 B1 * | 4/2002 | Reinhold | ............... | F16B 21/04 403/348 |
| 6,898,824 B2 * | 5/2005 | Zaltron | ............... | A63C 11/221 135/66 |
| 6,925,686 B2 * | 8/2005 | Heathcock | ............... | B25G 1/04 15/144.4 |
| 6,948,410 B1 * | 9/2005 | Larson | ............... | B25B 23/1427 173/176 |
| 7,980,781 B2 * | 7/2011 | Trice | ............... | B25G 1/04 403/349 |
| 8,197,155 B2 * | 6/2012 | Noh | ............... | B60T 11/046 403/348 |
| 8,469,406 B2 * | 6/2013 | Takahashi | ............... | F16L 37/23 285/316 |
| 8,490,250 B2 * | 7/2013 | Lanz | ............... | B25G 3/16 16/429 |
| 8,684,620 B2 * | 4/2014 | Lin | ............... | F16B 7/105 403/109.7 |
| 8,821,061 B2 * | 9/2014 | Baus | ............... | F16B 2/16 403/322.2 |
| 8,875,350 B2 * | 11/2014 | Bukovitz | ............... | C08F 293/00 16/429 |
| 9,205,549 B1 * | 12/2015 | Lin | ............... | B25G 1/04 |
| 9,267,547 B2 * | 2/2016 | Degner | ............... | F16D 1/108 |
| 9,511,213 B2 * | 12/2016 | Doll | ............... | A61M 39/00 |
| 9,970,591 B2 * | 5/2018 | Kallas | ............... | F16M 11/041 |
| 2002/0149200 A1 * | 10/2002 | Fumioka | ............... | A61M 39/1011 285/81 |
| 2003/0231927 A1 * | 12/2003 | Hale | ............... | B08B 9/045 403/349 |
| 2009/0226248 A1 * | 9/2009 | Wang | ............... | B25B 15/001 403/322.2 |
| 2012/0144626 A1 * | 6/2012 | Lanz | ............... | B25G 1/04 16/427 |
| 2013/0149027 A1 | 6/2013 | Lin | | |
| 2014/0137338 A1 | 5/2014 | Meinzer et al. | | |
| 2015/0089821 A1 | 4/2015 | Troudt | | |
| 2016/0186792 A1 * | 6/2016 | Valencia | ............... | F16B 7/20 403/349 |
| 2016/0190781 A1 | 6/2016 | Hendricks | | |
| 2016/0236339 A1 * | 8/2016 | Flaherty | ............... | B25G 1/01 |
| 2017/0334058 A1 | 11/2017 | Koch et al. | | |
| 2018/0328397 A1 * | 11/2018 | Hernandez | ............... | F16B 21/04 |

FOREIGN PATENT DOCUMENTS

| | | |
|---|---|---|
| CN | 101479147 | 7/2009 |
| JP | 2000-175321 | 6/2000 |
| JP | 2009-71911 | 4/2009 |
| JP | 2017-222023 | 12/2017 |
| TW | 200720030 | 6/2007 |
| WO | 2017/122753 | 7/2017 |

OTHER PUBLICATIONS

Office Action issued in Korean Patent Appl. No. 10-2018-7031871, dated Oct. 7, 2019, together with an English translation thereof.
International Search Report and Written Opinion (ISR/WO) issued in International Patent Application No. PCT/JP2018/020500, dated Jul. 24, 2018 (together with English language translation thereof).
Office Action issued in China Patent Appl. No. 201880001732.9, dated Sep. 2, 2021, together with English translation thereof.

* cited by examiner

TIP SIDE ◄──► OPERATOR SIDE

TIP SIDE ◄──► OPERATOR SIDE

Fig. 7

PRIOR ART

CONNECTION STRUCTURE OF OPERATION ROD

TECHNICAL FIELD

The present invention relates to a connection structure of a long-reach operation rod to which a tip tool can be attached.

BACKGROUND ART

In the case where a work object is located at a high position or in a work environment where operation or manipulation at a remote position is required for ensuring safety, it is common to use a long-reach operation tool with a tip tool attached to an operation rod. Various types of the tip tools are used depending on contents of work.

For example, in a case of overhead wiring, pincers, a cutter, a hammer, or the like are used. In consideration of workability, it is desirable that these tip tools have a common connection structure so that they can be attached to and detached from a single operation rod. With such a configuration, as quantity of equipment can be minimized, in addition to improvement in work efficiency, it is possible to reduce costs by commonization of the operation rod.

Figure 7:
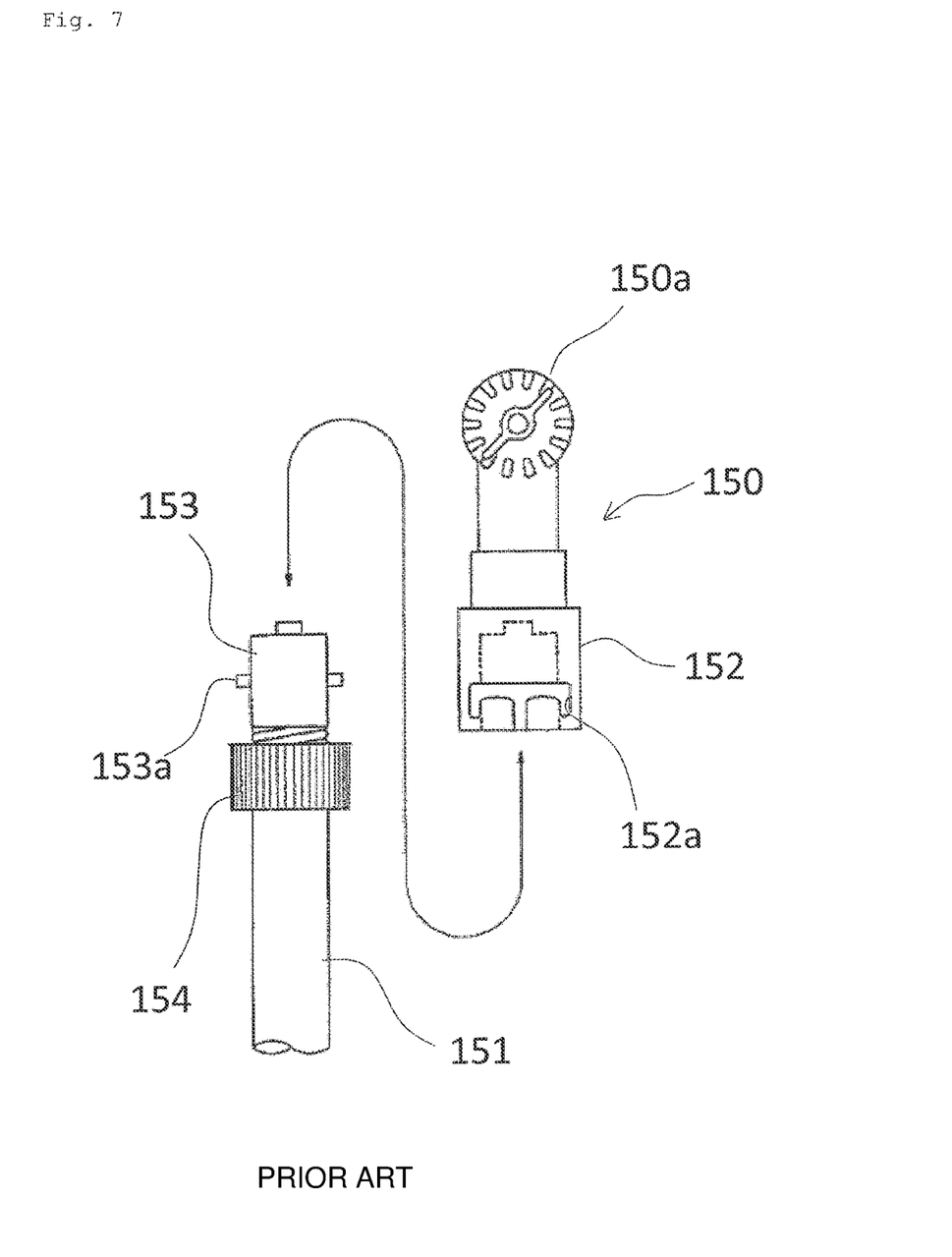
FIG. 7 is a diagram showing a conventional connection structure between a tip tool and an operation rod.

FIG. 7 shows a connection structure of a toothed adapter 150, one of conventional tip tools, and a common operation rod 151.

The toothed adapter 150 is disposed between another tool (not shown) and the common operation rod 151 to adjust a fixed angle. The toothed adapter 150 is provided with a toothed structure part 150a to be connected to another tool on a tip end thereof, and a mounting recess 152 to be connected with the common operation rod 151 on a lower end thereof, wherein the mounting recess 152 is formed with a notch 152a for engagement.

The common operation rod 151 is provided with a mounting part 153 having an engagement pin 153a engageable with the notch 152a on a tip end thereof. A rotating part 154 as a locking structure is screwed on the common operation rod 151 below the mounting part 153. With such a configuration, when the rotating part 154 is tightened in a state in which the mounting part 153 is coupled to the mounting recess 152 such that the engagement pin 153a is engaged with the notch 152a, the engaging structure composed of the mounting part 153 and the mounting recess 152 is locked and stabilized. A connection structure composed of such an engagement structure and a locking structure is described in Patent Document 1.

CITATION LIST

Patent Literature

Patent Literature 1: Japanese Patent Application Laid-Open No. Special Disclosure. 2009-071911

SUMMARY OF INVENTION

Technical Problem

However, although such screw fastening type locking structures as described above are excellent in terms of prevention of loosening, there are problems in terms of work efficiency such as difficulty in releasing fastening when the rotating part 154 is tightened too strongly for fixing.

Further, when disconnecting the connection, since the rotating part 154 must be moved away to a position where it does not interfere the disconnection in accordance with a space for disengaging engagement of, for example, a hook or a notch, it is troublesome to rotate the rotating part 154. In particular, in a case of a structure which requires deep engagement, as the deeper the engagement is, the more the rotating part 154 has to be moved away, it takes time for moving away of the rotating part 154 and there is possibility that the work efficiency is remarkably lowered. Such a tendency is more prominent as the number and types of tools used for the work increase.

Considering the above problems, an object of the present invention is to provide a connection structure of an operation rod in which a connection object such as a tip tool can be easily attached to and detached from the operation rod in a relatively short time without causing a fixed state.

Solution to Problem

In order to achieve the above purpose, in a connection structure of an operation rod according to the present invention, an engagement pair formed between the operation rod and a connection object of the operation rod is engaged with each other in a longitudinal direction of the operation rod to make connection, wherein the engagement pair comprises an operation rod side engagement part and a connection object side engagement part. The connection structure of the operation rod according to the present invention includes a main body integrally formed with the operation rod side engaging part and extending in the longitudinal direction, a moving body provided to move in the longitudinal direction relative to the main body, and a floating piece loosely arranged in a through-hole formed in the main body to extend in a direction intersecting with the longitudinal direction. The moving body is provided with a recessed part formed on a surface thereof opposing the main body at a position to which the through-hole is imaginarily projected (opposed) when the moving body is in contact with the connection object side engagement part in a state of engagement, wherein one end of the floating piece can be fitted in the recessed part.

In addition to the above configuration, the connection structure of the operation rod of the present invention includes an opposing moving body provided to oppose the moving body with the main body interposed therebetween and to be movable relative to the main body, and having a pushing part capable of pushing the other end of the floating piece into the through-hole to such an extent that one end of the floating piece can be fitted into the recessed part of the moving body.

Further, in addition to the above configuration, in the connection structure of the operation rod of the present invention, the opposing moving body is provided with an opposing recess formed on a side to oppose the recessed part, wherein the opposing recess is capable of accommodating the other end of the floating piece.

Advantageous Effects of Invention

As described above, according to the present invention, when the moving body movable relative to the main body is in contact with the connection object side engagement part in a state of engagement, the moving body is fixed by the floating piece loosely arranged in the through-hole of the main body being fitted into the recessed part. Thus, the connection object side engaging part can be movably locked with a slight play by simply aligning the moving body to contact on the connection object side engaging part.

Further, according to the present invention, in addition to the above effects, the opposing moving body moves relative to the main body independently of the moving body. Then, when the moving body is in a position to contact on the connection object side engaging part, by sliding the opposing moving body, the floating piece can be pushed into the recessed part of the moving body with the pushing part. Thus, the connection object side engaging part can be locked with the moving body by operating the opposing moving body.

Further, according to the present invention, in addition to the above effects, when the opposing recess of the opposing moving body is aligned with a position opposing the recessed part of the moving body, a space into which the floating piece fitted in the recessed part can be retracted is formed of the opposing recess. Thus, by operating the opposing moving body, the moving body locking the connection object side engaging part can be released.

DESCRIPTION OF EMBODIMENTS

First Embodiment

Figure 1:
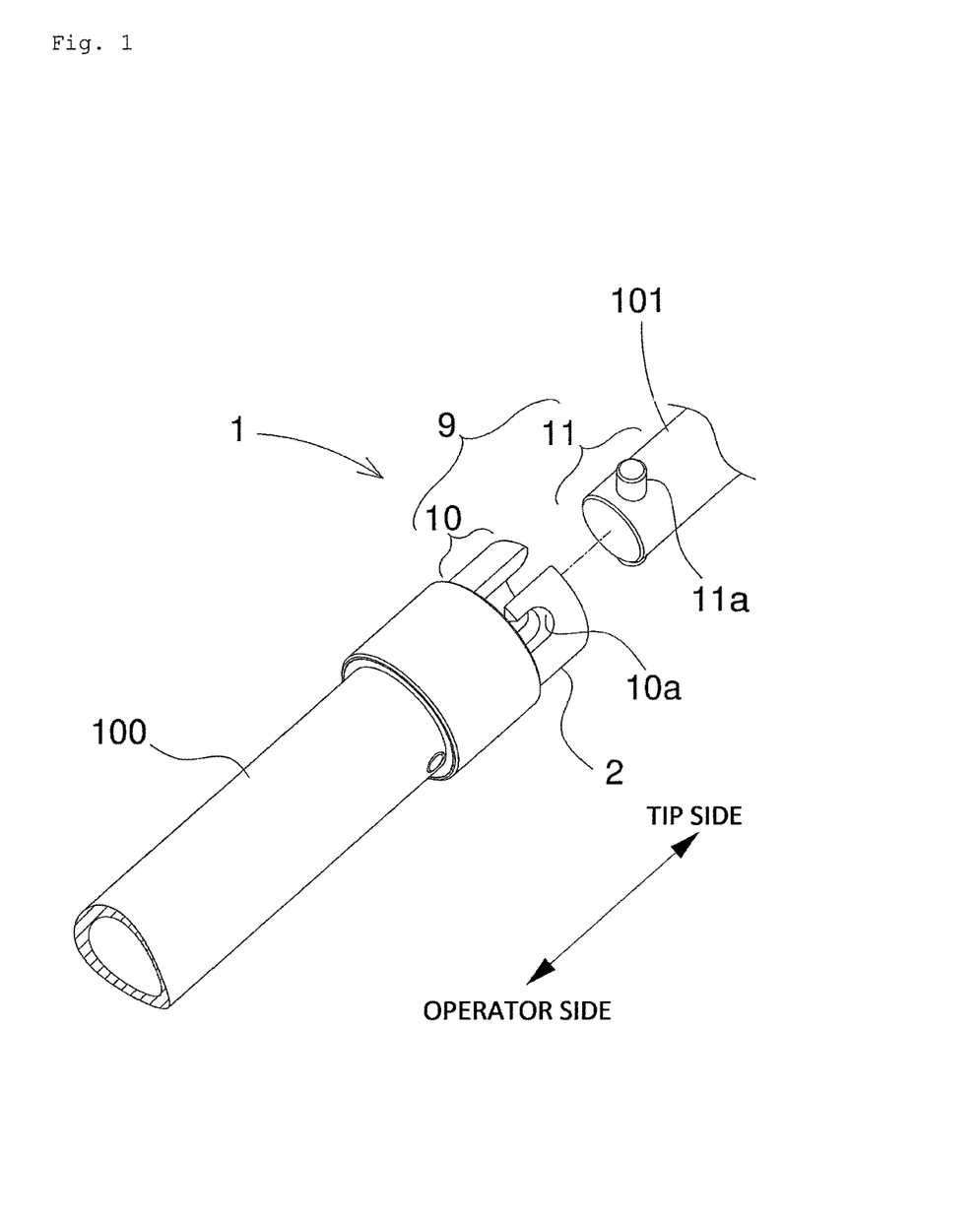
FIG. 1 is an overall perspective view of a connection structure of an operation rod according to a first embodiment of the present invention.

FIG. 1 is an overall perspective view showing a connection structure 1 of an operation rod 100 according to a first embodiment of the present invention. The connection structure 1 includes a configuration on a tip side of the operation rod 100 and a configuration on a side of a connection object, that is, a tip tool 101. Here, a state in which the operation rod 100 and the tip tool 101 are separated from each other is shown.

In FIG. 1, attention is paid only to a periphery including the connection structure 1, and for convenience of description, configurations on a lower side of the operation rod 100 and a main body side of the tip tool 101 are not shown. Here, a side on which the tip tool 101 is disposed is referred to as a tip side, and a side of an operating user is referred to as an operator side.

The operation rod 100 is provided with an engagement part 10 having a notch 10a formed therein on the tip side of the operation rod 100. The tip tool 101 is provided with an engagement part 11 (connection object side engagement part) having an engagement pin 11a on the operator side of the tip tool 101. The engagement part 10 and the engagement part 11 constitute an engagement pair 9.

The connection structure 1 according to the present embodiment includes an engagement structure formed of the engagement pair 9 and a locking structure for stably locking the engagement pair 9 in an engagement state. A specific configuration of the locking structure will be described later.

Figure 2:
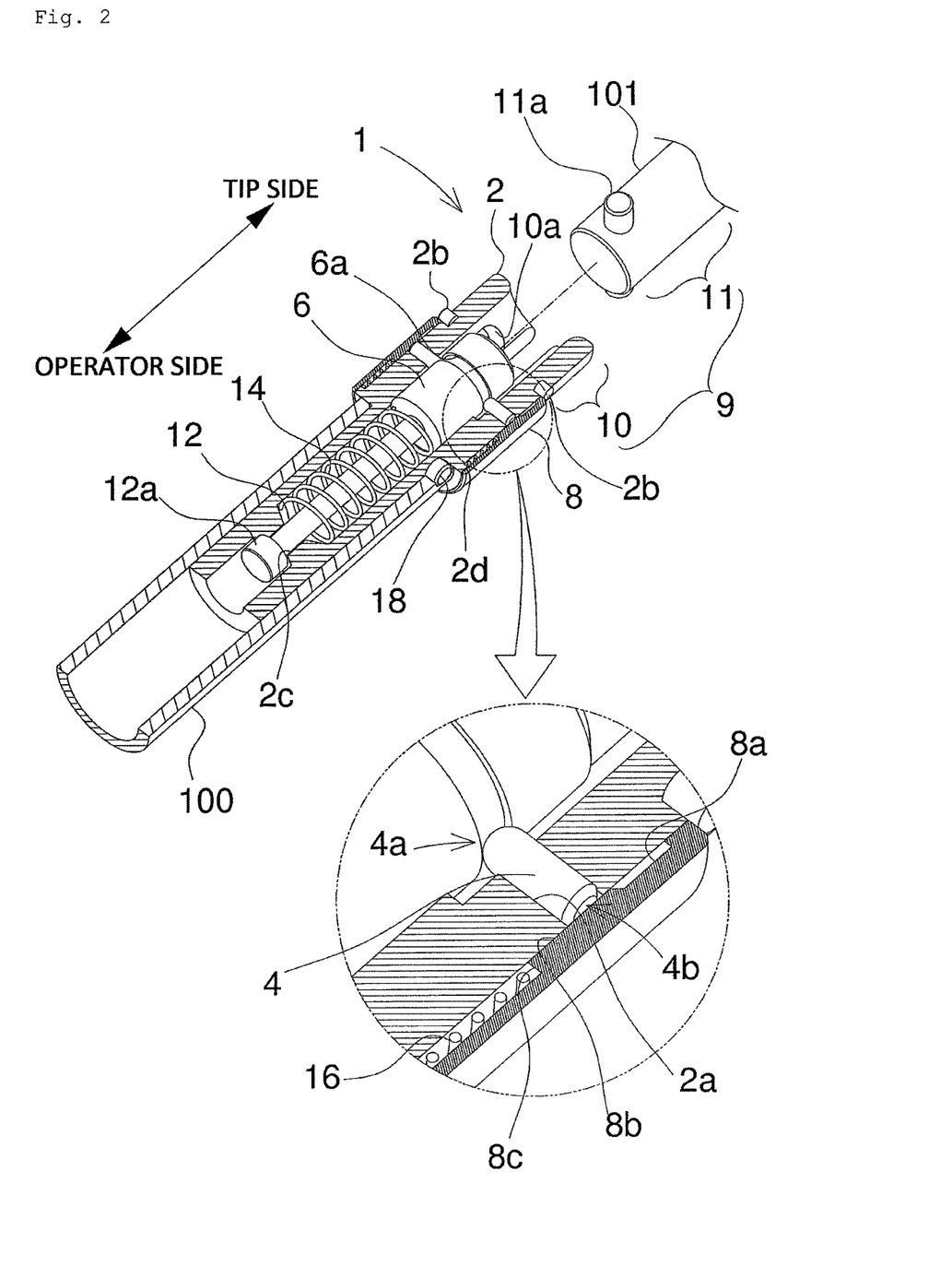
FIG. 2 is an overall perspective view partially cut away to explain a main part of the connection structure of FIG. 1.

FIG. 2 is a perspective view showing a structure on a side of the operation rod 100 of FIG. 1 in a state of part of the structure being partially cut away. Here, in order to show details of the structure, a portion surrounded by a circle is extracted and enlarged. The main body 2 is inserted into the cylindrical operation rod 100 on the tip side thereof. The main body 2 is fixed with a set screw 18 provided in a vicinity of an open end of the operation rod 100.

First, an inner structure of the main body 2 will be described.

An inner slider 6 is relatively slidably disposed to the main body 2 on the inner diameter side thereof. A mandrel 12 is extended from the inner slider 6 on the operator side thereof. An internal spring 14 is provided around the mandrel 12 for urging the inner slider 6 toward the tip side with respect to the operation rod 100. A stopper 12a is provided to the mandrel 12 on the operator side so that the inner slider 6 does not come off from the main body 2 to the tip side with urging of the internal spring 14. The inner slider 6 is restricted to move to the tip side by engagement of the stopper 12a with a narrow part 2c formed on the operator side of the main body 2. A recessed groove 6a (a recessed part) is formed to circumferentially extend around the inner slider 6 in an outer surface thereof.

Next, a configuration of the outside of the main body 2 will be described.

An outer slider 8 is relatively slidably disposed to the main body 2 on an outer diameter side thereof. An external spring 16 is provided inside the outer slider 8 for urging the main body 2 toward the tip side. The main body 2 has an enlarged diameter region on the tip side, wherein a portion of the main body 2 within the enlarged diameter region is expanded in a radial direction and larger than a portion inserted into the operation rod 100 in diameter. The main body 2 is formed with a locking projection 2d in the enlarged diameter region on the operator side for locking the external spring 16. In addition, the outer slider 8 is formed with a step 8c for locking the external spring 16 on the tip side. The main body 2 is provided with a stopper 2b for restricting the outer slider 8 urged by the external spring 16 to move toward the tip side. Thus, the outer slider 8 can slide between a position where the outer slider 8 contacts the stopper 2b on the tip side and a spring contraction limit position on the operator side.

Next, a configuration of a region where the inner slider 6, the main body 2, and the outer slider 8 are overlapped in a radial direction will be described.

Through-holes 2a are radially formed in the main body 2 in a region thereof sandwiched between the inner slider 6 and the outer slider 8 mentioned above. A locking member 4 (floating piece) is loosely disposed in each of the through-hole 2a. As can be seen from FIG. 2, in the configuration according to the present embodiment, the locking member 4 has a substantially cylindrical shape with a rounded tip. The locking member 4 is made to be slightly longer in the radial direction than a wall thickness of the enlarged diameter region of the main body 2. In other words, the locking member 4 is longer than the through-hole 2a. For this reason, the locking member 4 is configured such that the one end thereof constantly protrudes toward at least one of the inner diameter side and the outer diameter side of the main body 2. For convenience of explanation, an end of the locking member 4 on the inner diameter side is referred to as one end 4a, and an end on the outer diameter side is referred to as the other end 4b.

FIG. 2 shows a condition in which the one end 4a of the locking member 4 on the inner diameter side is fitted into the recessed groove 6a of the inner slider 6. In contrast, the other end 4b of the locking member 4 on the outer diameter side is sunken from an outer surface of the main body 2. In other words, the other end 4b is pushed further into the body 2 by the outer slider 8. A region on the outer slider 8 which can push the other end 4b further into the through-hole 2a is referred to as a pushing part 8b. An opposing recess 8a is formed in the outer slider 8 on the tip side of the pushing part 8b, which can be opposed to the recessed groove 6a when the outer slider 8 is slid to the operator side.

In the connection structure 1 according to the present embodiment, either one of the two structures of the opposing recess 8a and the pushing part 8b which can be opposed to the through-hole 2a can be selectively switched and aligned by sliding the outer slider 8. Thus, when the outer slider 8 is slid so as to align the opposing recess 8a (one of the two structures) with a position of the through-hole 2a, the other end 4b of the locking member 4 can be retracted into the opposing recess 8a on an outside in a radial direction. In a state that the recessed groove 6a of the inner slider 6 is aligned with the through-hole 2a on an inner diameter side thereof, when the outer slider 8 is slid so as to align the pushing part 8b (the other of the two structures) with the through-hole 2a on an outer diameter side thereof, the locking member 4 can be pushed into the through-hole 2a (toward the inner diameter side) by the pushing part 8b. In the present embodiment, as can be seen from FIG. 2, since the opposing recess 8a is formed with an inclined surface on the operator side, part of force toward the tip side (in an axial direction) by the external spring 16 is distributed in the radial direction to assist pushing action, and the locking member 4 can be smoothly pushed toward the inner diameter side. As described above, since the locking member 4 can be moved in the radial direction without providing a spring mechanism or the like for urging the locking member 4 in the radial direction, the structure can be designed simple, manufacturing costs can be reduced, and weight can be also reduced.

Next, motion of the connection structure 1 will be described with reference to FIG. 3.

Figure 3:
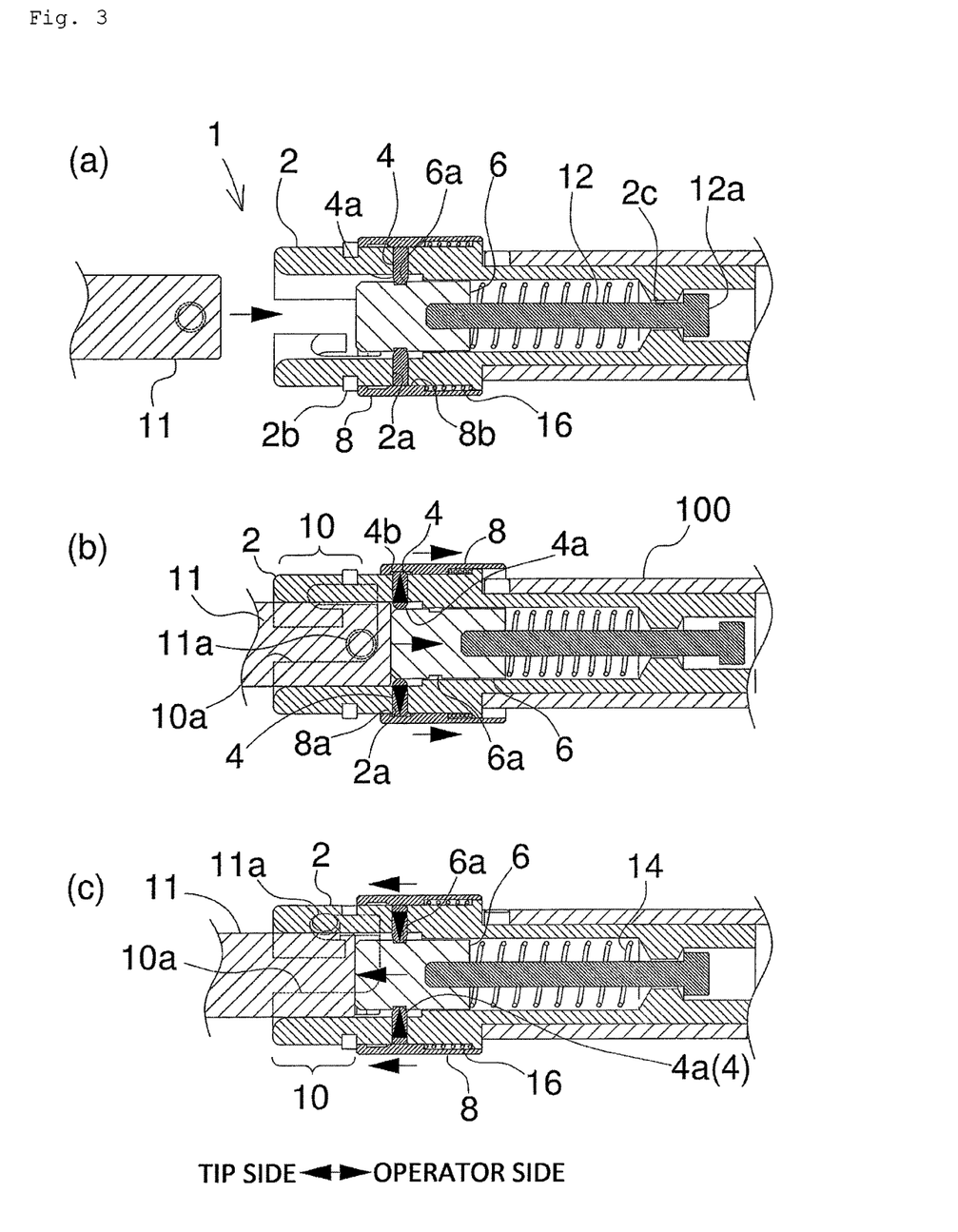
FIG. 3 is a central longitudinal cross-sectional view of the connection structure of FIG. 1, wherein (a) shows a separated state prior to connecting, (b) shows a fitting state in which an engagement pair is not engaged, and (c) shows a state in which the engagement pair is locked.

FIG. 3 is a central longitudinal cross-sectional view of the connection structure 1, wherein (a) shows a separated state before coupling, (b) shows an engagement state in which the engagement pair 9 (see FIG. 1) is not engaged, and (c) shows a state in which the engaged engagement pair 9 is locked.

First, FIG. 3 (a) shows a state in which the one end 4a of the locking member 4 on the inner diameter side is fitted into the recessed groove 6a of the inner slider 6. In the configuration according to the present embodiment, it is designed that when the stopper 12a is contacted with the narrowed portion 2c and restricted from moving toward the tip side, a space region formed by imaginarily projecting the through-hole 2a in the radial direction and the recessed groove 6a are aligned with each other. Therefore, when no external force is applied, the recessed groove 6a and the through-hole 2a of the inner slider 6 are aligned with each other in a longitudinal direction, and the locking member 4 can be pushed into the recessed groove Ga. Thus, in a state in which the outer slider 8 is only urged to the tip side by the external spring 16, the outer slider 8 is pressed against the stopper 2b of the main body 2, and the through-hole 2a is closed by the pushing part 8b. In other words, the inner slider 6 is locked with respect to the main body 2 in a state in which the tip tool 101 (see FIG. 1) is not connected and external force is not applied by user's operation. Accordingly, in order to engage the engagement part 11 of the tip tool 101 with the main body 2 in such a state, lock by the locking member 4 must be released first.

Next, FIG. 3 (b) shows a state in which the engagement part 11 of the tip tool 101 is inserted into the main body 2. The engagement part 11 is inserted up to a position, in which the engagement pin 11a provided on the engagement part 11 abuts on an end of the notch 10a on the operator side, wherein the notch 10a is formed in the engagement part 10 of the operation rod 100. Here, in order to insert the engagement part 11 to this position, the inner slider 6 needs to be moved from the locked position (a position where the through-hole 2a is aligned with the recessed groove 6a) to the operator side. In order to move the inner slider 6 in this manner, the locked state shown in FIG. 3 (a) must be released.

In FIG. 3 (b), the outer slider 8 is slid to the operator side by the user, and the through-hole 2a is aligned with the opposing recess 8a of the outer slider 8 inside thereof. As described above, as the other end 4b of the locking member 4 on the outer diameter side is retracted into the opposing recess 8a, the one end 4a on the inner diameter side can be come off from the recessed groove 6a of the inner slider 6, and the inner slider 6 is unlocked.

Next, FIG. 3 (c) shows a state in which the engagement pin 11a is engaged with the notch 10a in the longitudinal direction and the inner slider 6 is locked with respect to the main body 2. In order to obtain such a state, first, in the state of FIG. 3 (b), the engagement part 11 of the tip tool 101 is axially rotated. Then, when force for pushing the engagement part 11 to the operator side is lessened, the engagement part 11 is pushed out to the tip side together with the inner slider 6 by urging force of the internal spring 14, and the engagement pin 11a is pushed into a terminal end position (an engagement position) of the notch 10a. Further, when force holding the outer slider 8 toward the operator side is lessened, the outer slider 8 is pushed back to the tip side by urging force of the external spring 16.

Here, in the configuration according to the present embodiment, the recessed groove 6a is positioned on a surface of the inner slider 6 opposing to the main body 2 such that the recessed groove 6a is aligned with a position to which the through-hole 2a is imaginarily projected (opposed) when the inner slider 6 is in contact with the engagement part 11 of the tip tool 101 engaged, wherein the one end 4a of the locking member 4 can be fitted in the recessed groove 6a.

Accordingly, the locking member 4 is pushed in the through-hole 2a by the pushing part 8b of the outer slider 8 pushed to the tip side, and the one end 4a is fitted into the recessed groove 6a to have the inner slider 6 locked as shown in FIG. 3 (c).

As described above, when the engagement part 11 of the tip tool 101 is coupled, the engagement part 11 can be automatically locked by the inner slider 6 only by the user's operation of pulling the outer slider 8 toward the operator side against the urging force of the external spring 16 (FIG. 3 (a)), engaging the engagement part 11 inserted against the urging force of the internal spring 14 with the engagement part 10, and then releasing holding of the outer slider 8. When disengaging the engagement part 11, it is only necessary to slide the outer slider 8 in the same manner with reverse operation.

As described above, according to the connection structure 1 of the present embodiment, since the tip tool 101 can be engaged with one-touch operation, the work efficiency is remarkably improved. In addition, as the connection structure 1 has a locking structure including the inner slider 6, the outer slider 8, the through-hole 2a of the main body 2, and the locking member 4, and an engagement state can be automatically locked, safety can be improved at the same time.

Second Embodiment

Figure 4:
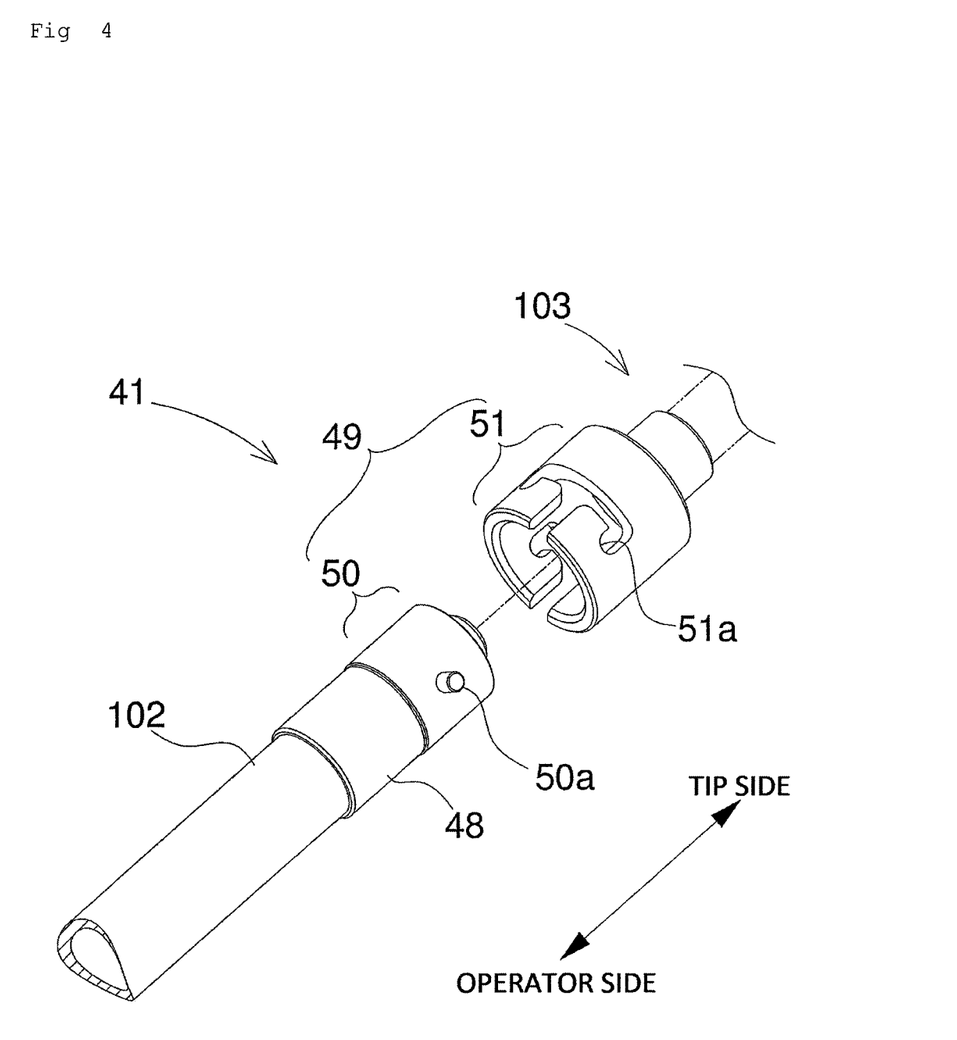
FIG. 4 is an overall perspective view of a connection structure of an operation rod according to a second embodiment of the present invention.

FIG. 4 is an overall perspective view showing a connection structure 41 of an operation rod 102 according to a second embodiment of the present invention. The connection structure 41 includes a configuration on a tip side of the operation rod 102 and a configuration on a side of a connection object, that is, a tip tool 103. Here, as in the first embodiment, a state in which the operation rod 102 and the tip tool 103 are separated from each other is shown.

In FIG. 4, attention is paid only to a periphery including the connection structure 41, and for convenience of description, configurations on a lower side of the operation rod 102 and a main body side of the tip tool 103 are not shown. It is also the same as in the first embodiment that a side on which the tip tool 103 is disposed is referred to as a tip side, and a side of an operating user is referred to as an operator side.

The tip tool 103 is provided with an engagement part 51 (a connection object side engagement part) having a notch 51a formed therein on the operator side of the tip tool 103. The operation rod 102 is provided with an engagement part 50 (operation rod side engagement part) having an engagement pin 50a on the tip side of the operation rod 102. The engagement parts 50 and 51 form an engagement pair 49.

The connection structure 41 according to the present embodiment includes an engagement structure formed of the engagement pair 49 and a locking structure for stably locking the engagement pair 49 in an engagement state. A specific configuration of the locking structure will be described later.

Figure 5:
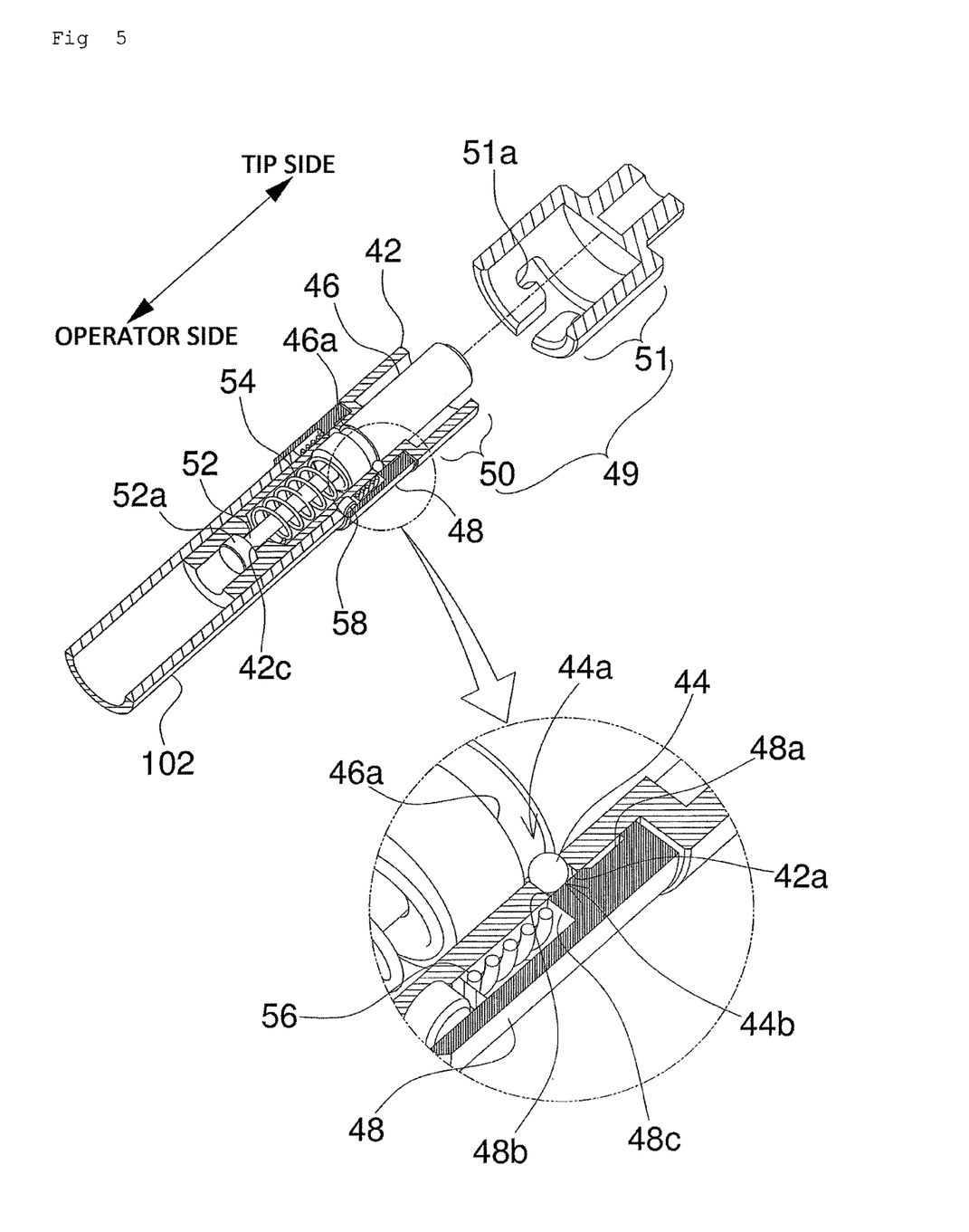
FIG. 5 is an overall perspective view partially cut away to explain a main part of the connection structure of FIG. 4

FIG. 5 is a perspective view showing a structure of the connection structure 41 of FIG. 4 in state of part of the structure being partially cut away. Here, in order to show the details of the structure, a portion surrounded by a circle is extracted and enlarged. The main body 42 is inserted into the cylindrical operation rod 102 on the tip side thereof. The main body 42 is fixed with a set screw 58 provided in a vicinity of an open end of the operation rod 102.

First, an inner structure of the main body 42 will be described.

An inner slider 46 is relatively slidably disposed to the main body 42 on the inner diameter side thereof. A mandrel 52 is extended from the inner slider 46 on the operator side thereof. An internal spring 54 is provided around the mandrel 52 for urging the inner slider 46 toward the tip side with respect to the operation rod 102. A stopper 52a is provided to the mandrel 52 on the operator side so that the inner slider 46 does not come off from the main body 42 to the tip side with urging of the internal spring 54. The inner slider 46 is restricted to move to the tip side by engagement of the stopper 52a with a narrow part 42c formed on the operator side of the main body 42. A recessed groove 46a (a recessed part) is formed to circumferentially extend around the inner slider 46 in an outer surface thereof.

Next, a configuration of the outside of the main body 42 will be described.

An outer slider 48 is relatively slidably disposed to the main body 42 on an outer diameter side thereof. An external spring 56 is provided inside the outer slider 48 for urging the outer slider 48 itself toward the tip side. The main body 42 has an enlarged diameter region on the tip side, wherein a portion of the main body 42 within the enlarged diameter region is expanded in a radial direction and larger than a portion inserted into the operation rod 102 in diameter. The external spring 56 is disposed such that the operator side thereof comes into contact with an opening edge of the operation rod 102. Also, the external spring 56 is disposed such that the tip side thereof comes into contact with the step 48c formed inside the outer slider 48. Thus, the outer slider 48 can slide between a position where the outer slider 48 contacts a stepped portion of the main body 42 in the enlarged diameter region on the operator side of the main body 42 (the tip side of the outer slider 48) and a contraction limit position on the operator side.

Next, a configuration of a region where the inner slider 46, the main body 42, and the outer slider 48 overlap in the radial direction will be described.

Through-holes 42a are radially formed in the main body 42 in a region thereof sandwiched between the inner slider 46 and the outer slider 48 mentioned above. A locking member 44 (floating piece) is loosely disposed in each of the through-hole 42a. As can be seen from FIG. 5, in the configuration according to the present embodiment, the locking member 44 is formed in a substantially spherical shape. The locking member 44 is made to be slightly larger than a wall thickness of the main body 42 in the radial direction to protrude out of the through-hole 42a. For this reason, the locking member 44 is configured such that the one end thereof constantly protrudes toward at least one of the inner diameter side and the outer diameter side of the main body 42. For convenience of explanation, an end of the locking member 44 on the inner diameter side is referred to as one end 44a, and an end on the outer diameter side is referred to as the other end 44b.

FIG. 5 shows a condition in which the one end 44a of the locking member 44 on the inner diameter side is fitted into the recessed groove 46a of the inner slider 46. In contrast, the other end 44b of the locking member 44 on the outer diameter side is sunken from an outer surface of the main body 42. In other words, the other end 44b is pushed further into the body 42 by the outer slider 48. A region on the outer slider 48 which can push the other end 44b further into the through-hole 42a is referred to as a pushing part 48b. An opposing recess 48a is formed in the outer slider 48 on the tip side of the pushing part 48b, which can be opposed to the recessed groove 6a when the outer slider 48 is slid to the operator side.

In the connection structure 41 according to the present embodiment, either one of the two structures of the opposing recess 48a and the pushing part 48b which can be opposed to the through-hole 42a can be selectively switched and aligned by sliding the outer slider 48. Thus, when the outer slider 48 is slid so as to align the opposing recess 48a (one of the two structures) with a position of the through-hole 42a, the other end 44b of the locking member 44 can be retracted into the opposing recess 48a. In a state that the recessed groove 46a of the inner slider 46 is aligned with the through-hole 42a on an inner diameter side thereof, when the outer slider 48 is slid so as to align the pushing part 48b with the through-hole 42a on an outer diameter side thereof, the locking member 44 can be pushed into the through-hole 42a by the pushing part 48b. In the present embodiment, as can be seen from FIG. 5, since the opposing recess 48a is formed with an inclined surface on the operator side, part of force toward the tip side (in an axial direction) by the external spring 56 is distributed in the radial direction to assist pushing action, and the locking member 44 can be smoothly pushed toward the inner diameter side. As described above, since the locking member 44 can be moved in the radial direction without providing a spring mechanism or the like for urging the locking member 4 in the radial direction, the structure can be designed simple, manufacturing costs can be reduced, and weight can be also reduced.

Next, motion of the connection structure 41 (shown in FIG. 4) will be described with reference to FIG. 6.

Figure 6:
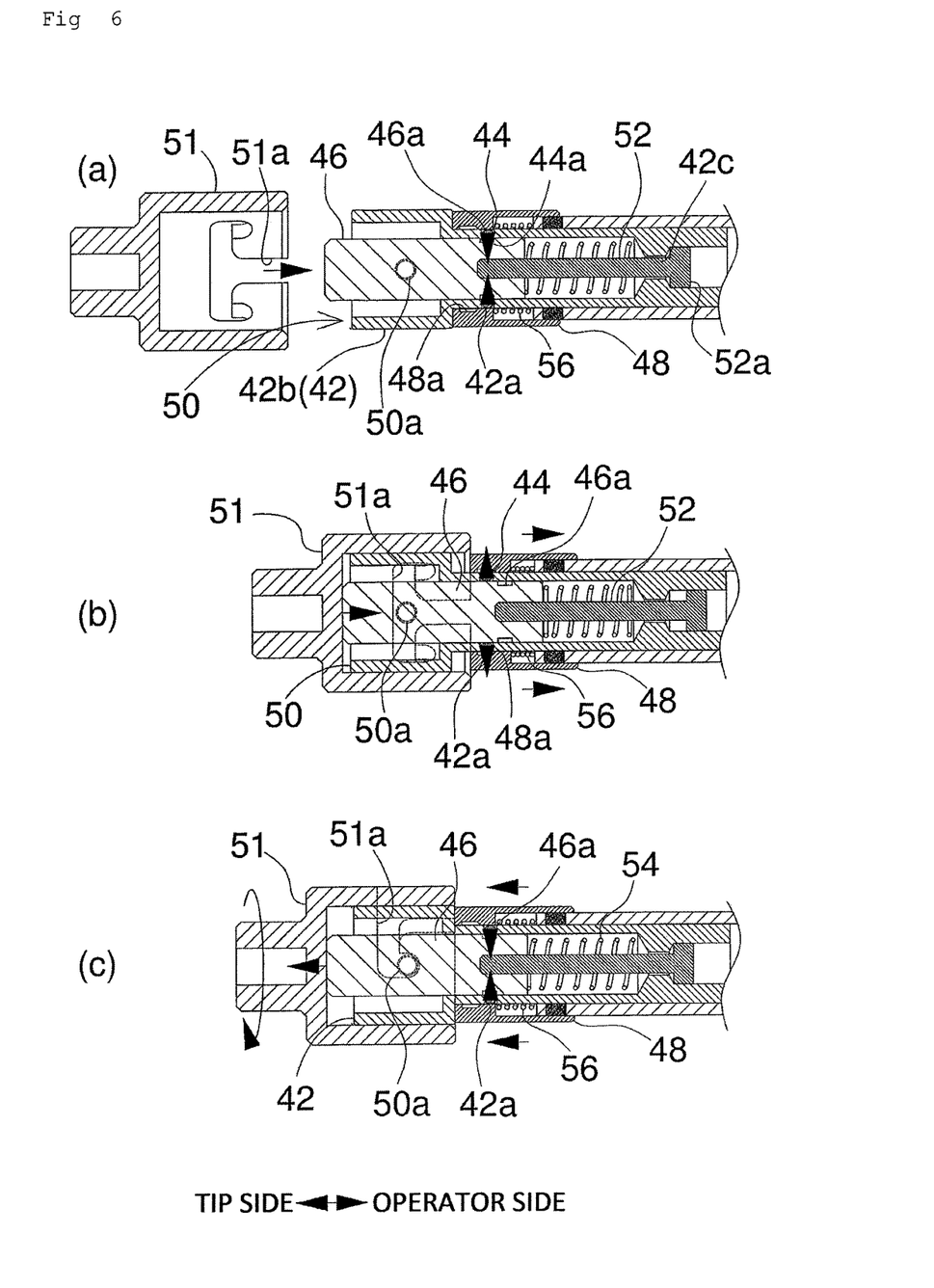
FIG. 6 is a central longitudinal cross-sectional view of the connection structure of FIG. 4, wherein (a) shows a separated state prior to connecting, (b) shows a fitting state in which an engagement pair is not engaged, and (c) shows a state in which the engagement pair is locked.

FIG. 6 is a central longitudinal cross-sectional view of the connection structure 41 shown in FIG. 4, wherein (a) shows a separated state before coupling, (b) shows an engagement state in which the engagement pair 49 (see FIG. 5) is not engaged, and (c) shows a state in which the engaged engagement pair 49 is locked.

First, FIG. 6 (a) shows a state in which the one end 44a of the locking member 44 on the inner diameter side is fitted into the recessed groove 46a of the inner slider 46. Accordingly, in the configuration according to the present embodiment, it is designed that when a position to which the through-hole 42a is imaginarily projected (opposed) in the radial direction and the recessed groove 46a are aligned with each other, the stopper 52a is contacted with the narrowed portion 42c and restricted from moving toward the tip side. Therefore, when no external force is applied, the recessed groove 46a and the through-hole 42a of the inner slider 46 are aligned with each other in a longitudinal direction, and the locking member 44 can be pushed into the recessed groove 46a. Thus, in a state that only urging by the external spring 56 is acting on the outer slider 48, the outer slider 48 is pressed against the enlarged diameter part 42b of the main body 42, and the through-hole 42a is closed by the pushing part 48b (see the enlarged view in FIG. 5). In other words, the inner slider 46 is locked with respect to the main body 42 in a state in which the tip tool is not connected and external force is not applied by user's operation. Accordingly, in order to engage the engagement part 51 of the tip tool 103 (see FIG. 4) with the main body 42 in such a state, lock by the locking member 44 must be released first.

Next, FIG. 6 (b) shows a state in which the tip of the main body 42 is inserted into the engagement part 51 of the tip tool 103 is shown. The engagement part 51 is inserted up to a position, in which the engagement pin 50a provided on the engagement part 51 abuts on an end of the notch 51a on the operator side, wherein the notch 51a is formed in the engagement part 50. Here, in order to insert the engagement part 50 to this position, the inner slider 46 needs to be moved from the locked position (a position where the through-hole 42a is aligned with the recessed groove 46a) to the operator side. In order to move the inner slider 46 in this manner, the locked state shown in FIG. 6 (a) must be released.

In FIG. 6 (b), the outer slider 48 is slid to the operator side by the user, and the through-hole 42a is aligned with the opposing recess 48a of the outer slider 48 inside thereof. As described above, as the other end 44b (see FIG. 5) of the locking member 44 on the outer diameter side is retracted into the opposing recess 48a, the one end 44a (see FIG. 5) on the inner diameter side can be come off from the recessed groove 46a of the inner slider 46, and the inner slider 46 is unlocked.

Next, FIG. 6 (c) shows a state in which the engagement pin 50a is engaged with the notch 51a in the longitudinal direction and the inner slider 56 is locked with respect to the main body 42. In order to obtain such a state, first, in the state of FIG. 6 (b), the engagement part 51 of the tip tool 103 is axially rotated. Then, when force for pushing the engagement part 51 to the operator side is lessened, the engagement part 51 is pushed out to the tip side together with the inner slider 46 by urging force of the internal spring 54, and the engagement pin 50a is pushed into a terminal end position (an engagement position) of the notch 51a. Further, when force holding the outer slider 48 toward the operator side is lessened, the outer slider 48 is pushed back to the tip side by urging force of the external spring 56.

Here, in the configuration according to the present embodiment, the recessed groove 46a is positioned on a surface of the inner slider 46 opposing to the main body 42 such that the recessed groove 46a is aligned with a position to which the through-hole 42a is imaginarily projected (opposed) when the inner slider 46 is in contact with the engagement part 51 of the tip tool 103 engaged, wherein the one end 44a (see FIG. 6 (a)) of the locking member 44 can be fitted in the recessed groove 46a.

Accordingly, the locking member 44 is pushed in the through-hole 42a by the pushing part 48b (see FIG. 5) of the outer slider 48 pushed to the tip side, and the one end 44a is fitted into the recessed groove 46a to have the inner slider 46 locked as shown in FIG. 6 (c).

As described above, when the engagement part 51 of the tip tool 103 is coupled, the engagement part 51 can be automatically locked by the inner slider 46 only by the user's operation of pulling the outer slider 48 toward the operator side against the urging force of the external spring 56 (FIG. 6 (a)), engaging the engagement part 51 fitted against the urging force of the internal spring 54 with the engagement part 50, and then releasing holding of the outer slider 8. When disengaging the engagement part 51, it is only necessary to slide the outer slider 48 in the same manner with reverse operation.

As described above, according to the connection structure 41 of the present embodiment, since the tip tool 103 can be engaged with one-touch operation, the work efficiency is remarkably improved. In addition, as the connection structure 41 has a locking structure including the inner slider 46, the outer slider 48, the through-hole 42a of the main body 42, and the locking member 44, and an engagement state can be automatically locked, safety can be improved at the same time.

Further the main body 42 is formed with the enlarged diameter region an outer diameter of which is substantially the same as or slightly larger than that of the outer slider 48. As a result, the engagement part 51 on a tool side and the outer slider 48 do not directly interfere with each other. Therefore, since external force other than force by operation of user is not applied to the outer slider 48 in a locked state, it is possible to prevent a locking state from being inadvertently released during the operation.

The configuration of each of the above embodiments is an example of the present invention, modification examples as below shall be included.

For example, in the respective embodiments, in order to fix the engagement state, the inner sliders 6 and 46 are in contact with the engagement parts 11 and 51 of the tip tools 101 and 103 by the urging of the internal springs 14 and 54. However, the outer slider may directly contact and press the engagement part to fix the same.

In the respective embodiments, the examples of the configurations in which the inner sliders 6 and 46, the outer sliders 8 and 48, and the main bodies 2 and 42 are arranged in a nested manner are shown. However, these three members may be arranged in parallel in a direction other than the radial direction.

In the respective embodiments, the examples of the configurations in which the inner sliders 6 and 46 are formed in a substantially cylindrical shape are shown. However, the present invention is not limited to this, and the inner sliders 6 and 46 may be formed in a prism shape.

Further, in respective embodiments, the examples of the configurations in which the outer sliders 8 and 48 are provided so as to slide in the longitudinal direction with respect to the main bodies 2 and 42 are shown. The configurations in which any of structures of the opposing recesses 8a, 48a and the pushing parts 8b, 48b arranged in the longitudinal direction is moved with sliding of the outer sliders 8, 48 in the longitudinal direction, and a lock state is switched by selectively positioning the structure to oppose the recessed grooves 6a, 46a of the inner sliders 6, 46 is shown. However, the present invention is not limited thereto, and for example, the outer slider may be arranged to slide in a circumferential direction. In this case, by arranging the opposing recess and the pushing part for switching the lock state in the circumferential direction, it is possible to switch the lock state in the same manner as the above embodiments by performing sliding operation of the outer slider in the circumferential direction. Further, arranging an urging means corresponding to the external springs 16 and 56 to urge in the circumferential direction can also make one-touch operation possible.

In addition, in the respective embodiments, the examples of the configurations in which the recessed parts formed in the inner sliders 6 and 46 for engaging the locking members 4 and 44 are formed as recessed grooves 6a and 46a extending circumferentially around the inner sliders 6 and 46 are shown. However, when the inner sliders 6 and 46 are restrained from rotating around their axes, it is unnecessary to form a recessed part over the entire circumference, and it is sufficient that the recessed parts are formed only at the imaginarily projected (opposed) positions of the through-holes 2a and 42a.

INDUSTRIAL APPLICABILITY

Since the connection structure of the operation rod of the present invention can lock the engagement structure with one-touch operation, in addition to structures where the connection object is a tip tool, the connection structure is also useful for structures in which operation rods are connected with each other.

REFERENCE SIGNS LIST 1 connection structure
2 main body
2a through-hole
2b stoppers (enlarged diameter part)
2c narrow part
2d locking projection
4 locking member (floating piece)
4a one end
4b other end
6 Inner slider (moving body)
6a recessed groove
8 outer slider (opposing moving body)
8a opposing recess
8b pushing part
8c step
9 engagement pair
10 engagement part (operation rod side engagement part)
10a notch
11 engagement part (connection object side engagement part)
11a engagement pin
12 mandrel
12a stopper
14 internal springs
16 external spring
18 set screw
41 connection structure
42 main body
42a through-hole
42b enlarged diameter part
42c narrow part
44 locking member (floating piece)
44a one end
44b other end
46 inner slider (moving body)
46a recessed groove
48 outer slider (opposing moving body)
48a opposing recess
48b pushing part
48c step
49 engagement pair
50 engagement part (operation rod side engagement part)
50a engagement pin
51 engagement part (connection object side engagement part)
51a notch
52 mandrel
52a stopper
54 internal spring
56 external spring
58 set screw
100, 102 operation rod
101, 103 tip tool (connection object)
150 toothed adapter
150a toothed structure
151 common operation rod
152 mounting recess
152a notch
153 mounting part
153a engagement pin
154 rotating part

The invention claimed is:

1. A connection structure of an operation rod to connect the operation rod with a connection object by engaging an operation rod side engagement part of the operation rod with a connection object side engagement part of the connection object in a longitudinal direction of the operation rod, the connection structure of the operation rod comprising:

a main body integrally formed with the operation rod side engagement part and extending in the longitudinal direction;

a moving body of the operation rod, the moving body being movable in the longitudinal direction relative to the main body; and a floating piece loosely arranged in a through-hole provided in the main body to extend in a direction intersecting with the longitudinal direction, wherein the moving body includes a recessed part on a surface of the moving body facing the main body at a position where the through-hole is aligned when the moving body is in contact with the connection object side engagement part of the connection object in a state of engagement, in which a first end of the floating piece is fitted in the recessed part, wherein the moving body is provided in the main body and is urged toward a tip side end of the main body in a state that the moving body is not in contact with the connection object side engagement part.

2. The connection structure of an operation rod according to claim 1, further comprising an opposing moving body that faces the moving body with the main body interposed between the opposing moving body and the moving body, and is movable relative to the main body, wherein the opposing moving body includes a pushing part configured to push a second end of the floating piece into the through-hole to such an extent that the first end of the floating piece is fitted into the recessed part of the moving body.

3. The connection structure of an operation rod according to claim 2, wherein the opposing moving body includes an opposing recess on a side to face the recessed part of the moving body, and wherein the opposing recess is configured to accommodate the second end of the floating piece.

4. The connection structure of an operation rod according to claim 1, wherein the first end of the floating piece is fitted in the recessed part facing the main body at the position where the through-hole is aligned, in a state that the moving body is not in contact with the connection object side engagement part.

5. The connection structure of an operation rod according to claim 1, wherein a tip side end of the moving body is not movable beyond the tip side end of the main body.

6. The connection structure of an operation rod according to claim 1, wherein the moving body is provided in the main body and is urged toward a tip side end of the main body in a state that the operation rod is connected with the connection object.

* * * * *